United States Patent
Rumreich

(10) Patent No.: US 7,605,832 B2
(45) Date of Patent: Oct. 20, 2009

(54) METHOD AND APPARATUS FOR IMPROVING IMAGES PROVIDED BY SPATIAL LIGHT MODULATED (SLM) DISPLAY SYSTEMS

(75) Inventor: Mark Francis Rumreich, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 174 days.

(21) Appl. No.: 10/593,509
(22) PCT Filed: Mar. 22, 2005
(86) PCT No.: PCT/US2005/009621

§ 371 (c)(1),
(2), (4) Date: Sep. 20, 2006

(87) PCT Pub. No.: WO2005/094071

PCT Pub. Date: Oct. 6, 2005

(65) Prior Publication Data

US 2007/0273703 A1 Nov. 29, 2007

Related U.S. Application Data

(60) Provisional application No. 60/555,253, filed on Mar. 22, 2004.

(51) Int. Cl.
G09G 5/02 (2006.01)
G09G 3/00 (2006.01)
(52) U.S. Cl. ............................ 345/694; 345/698; 345/32
(58) Field of Classification Search ................. 345/428, 345/581, 660, 694–698, 32
See application file for complete search history.

(56) References Cited

U.S. PATENT DOCUMENTS

| 5,490,009 | A | * | 2/1996 | Venkateswar et al. ....... 359/291 |
| 6,243,055 | B1 | | 6/2001 | Fergason |
| 6,657,603 | B1 | * | 12/2003 | Demetrescu et al. .......... 345/32 |
| 6,973,210 | B1 | * | 12/2005 | Platt et al. .................... 382/162 |
| 7,098,936 | B2 | * | 8/2006 | Cole et al. ................... 345/698 |

(Continued)

FOREIGN PATENT DOCUMENTS

| EP | 0790514 | 8/1997 |
| EP | 0794676 | 9/1997 |
| WO | WO01/69942 | 9/2001 |

OTHER PUBLICATIONS

Search report dated Jul. 8, 2005.

*Primary Examiner*—Chante Harrison
(74) *Attorney, Agent, or Firm*—Robert D. Shedd; Harvey D. Fried; James McKenzie

(57) ABSTRACT

The invention provides a method and system for reducing distortion in images provided by display systems employing Spatial Light Modulating elements is provided. A method comprises steps of providing a set of pixel values corresponding to pixels of an image to be displayed. The number of pixel values comprising the set is greater than the number of available SLM elements. At least some of the pixel values are adjusted to provide a set of adjusted pixel values. At least a first set of pixels and a second set of pixels are generated from the set of adjusted pixel values. The image is displaying as a matrix of pixels comprising the first set of pixels and the second set of pixels. At least one of the pixels of the first set overlaps at least one of the pixels of the second set and the adjusting step is carried out by adjusting pixel values of the pixel data set to compensate for image distortion due to overlapping pixels of the matrix.

11 Claims, 7 Drawing Sheets

U.S. PATENT DOCUMENTS 7,190,380 B2 * 3/2007 Damera-Venkata et al. . 345/698
7,301,549 B2 * 11/2007 Damera-Venkata ......... 345/698
2003/0133060 A1 7/2003 Shimada
2004/0032419 A1 2/2004 Zhou et al.

* cited by examiner

METHOD AND APPARATUS FOR IMPROVING IMAGES PROVIDED BY SPATIAL LIGHT MODULATED (SLM) DISPLAY SYSTEMS

CROSS REFERENCE TO RELATED APPLICATIONS

This application claims the benefit, under 35 U.S.C. § 365 of International Application PCT/US2005/009621, filed Mar. 22, 2005, which was published in accordance with PCT Article 21(2) on Oct. 6, 2005 in English and which claims the benefit of U.S. provisional patent application No. 60/555,253 filed Mar. 22, 2004.

FIELD OF THE INVENTION

The present invention generally relates to Spatial Light Modulation (SLM) display systems, and in particular to filters and filter methods for use in SLM systems.

BACKGROUND OF THE INVENTION

Spatial Light Modulating (SLM) systems include Digital Light Processing™ (DLP™) systems. DMD and DLP™ are trademarks of Texas Instruments Corporation. Recent developments in SLM technology rely on SLM elements that provide diamond shaped pixels instead of square shaped pixels. Processing techniques for SLM systems include a so called "smooth pixel" processing technique. According to the smooth pixel technique, a displayed image is formed by combining a first set of pixels with a second set of pixels. The second set is displaced from the first set. The combined first and second pixel sets form a displayed image.

In one example SLM system, an SLM array comprising a number of SLM elements provides first and second pixel sets for each incoming picture, or frame, to be displayed. The combined pixels from the first and second pixel sets provide more displayed pixels than the number of SLM elements employed to provide the pixel sets.

However, a drawback is associated with this technique. Pixels of the first and second pixel sets overlap in the displayed image. At least some of the pixels from the first set effectively overlap at least some of the pixels from the second set. As a result, when the pixel sets are displayed together so as to form an image, light in the regions of overlapping pixels is a combination of light from each of the overlapping pixels. This sometimes results in brighter than intended, or less bright than intended image portions.

Thus, some loss of image quality is incurred with this technique as compared to other display techniques. Accordingly, image processing devices and methods are needed that account for distortion due to overlapping pixels in displayed pixel sets of SLM devices.

SUMMARY OF THE INVENTION

According to various embodiments of the invention methods and systems for reducing distortion in images provided by display systems (100) employing Spatial Light Modulating (SLM) elements are provided. A method according to one embodiment of the invention comprises steps of providing a set (620) of pixel values corresponding to pixels of an image to be displayed. The number of pixel values comprising the set is greater than the number of available SLM elements. At least some of the pixel values are adjusted to provide a set of adjusted pixel values (678). At least a first set of pixels and a second set of pixels are generated from the set of adjusted pixel values. The image is displayed as a matrix of pixels (450) comprising the first set of pixels (410) and the second set of pixels (430). At least one of the pixels of the first set overlaps at least one of the pixels of the second set and the adjusting step is carried out by adjusting pixel values of the set of pixel values to compensate for image distortion due to overlapping pixels of the matrix.

BRIEF DESCRIPTION OF THE DRAWINGS

Embodiments of the present invention will be described below in more detail, with reference to the accompanying drawings, in which.

DETAILED DESCRIPTION

Spatial Light Modulator (SLM) devices find increasing use in a wide range of imaging applications such as video image projection and printing. Typical spatial light modulators include devices such as Liquid Crystal Devices (LCDs) and digital micro-mirror devices (DMDs™). A typical spatial light modulator comprises a two-dimensional array of modulator elements that operate upon incident light in order to form a two-dimensional image on a display surface. LCD based devices use light polarization characteristics in order to modulate each light element in the array. DMD™ based devices use an array of tiny micro-mirrors to modulate individual light elements. Each element in a spatial light modulator array exhibits a variable light intensity in response to a corresponding drive voltage level. In one embodiment of the invention, each element in an SLM array corresponds to at least one pixel of a displayed image.

Figure 1:
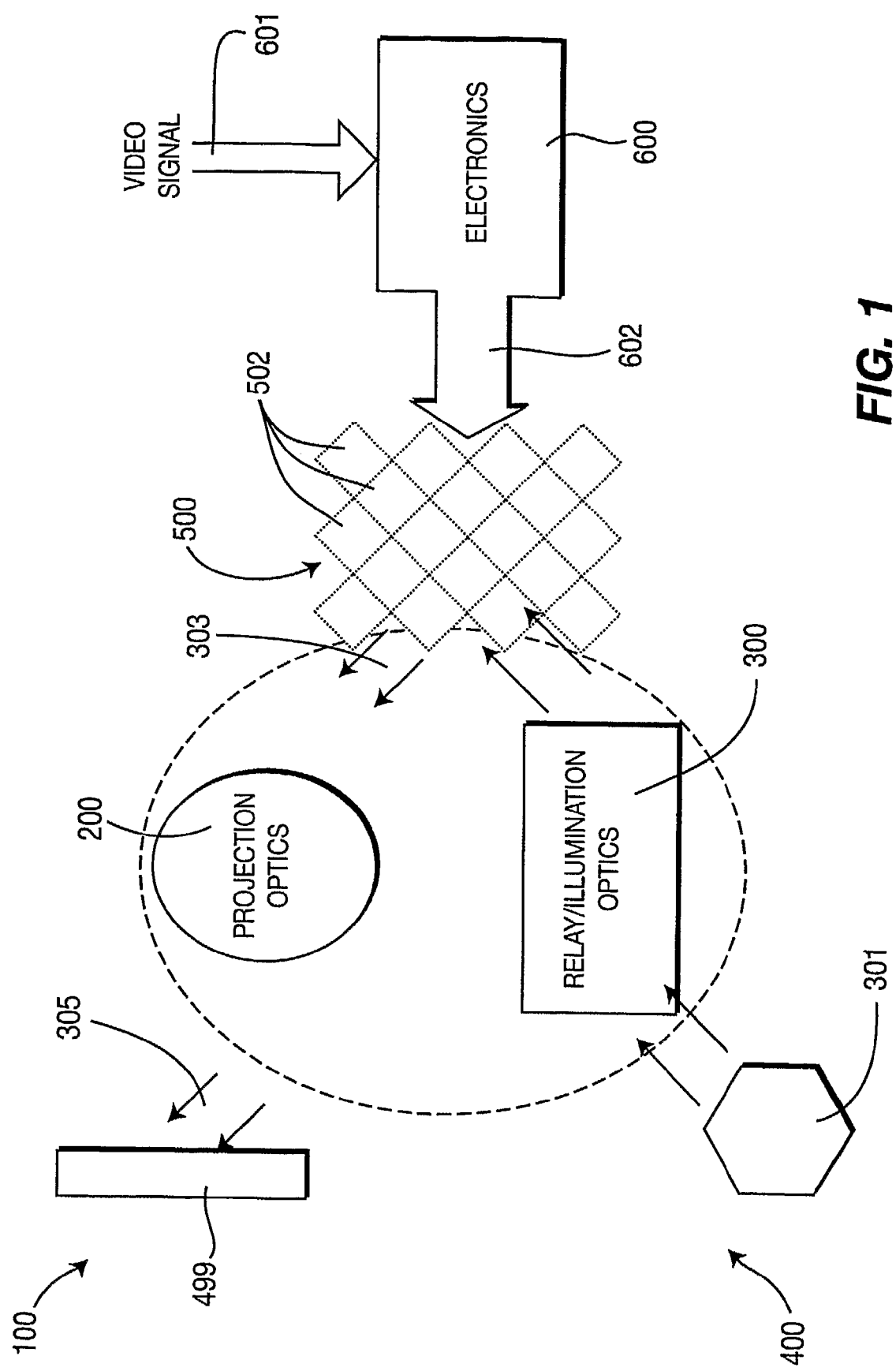
FIG. 1 is a block diagram illustrating a display system including an array of spatial light modulation (SLM) elements suitable for implementing various embodiments of the invention.

FIG. 1 is a pictorial diagram illustrating an example system 100 including a Spatial Light Modulating (SLM) array 500 suitable for implementing various embodiments of the present invention. System 100 comprises at least one light source 301 coupled to an optical system 400. Optical system 400 comprises relay and illumination optics 300 and projection optics 200. Optical system 400 includes at least one array 500 of spatial light modulating elements 502. According to an embodiment of the invention array 500 comprises a semiconductor-based array of reflective light elements 502. According to one embodiment of the invention, SLM array 500 comprises a binary Pulse Width Modulated (PWM) array 500 of light switching elements 502. In one embodiment, elements 502 of PWM array 500 comprise micro-electromechanical system (MEMS) devices, for example, mirrors of a Digital Micromirror Device™ (DMD)™.

An electronics subsystem 600 includes an input for receiving a video signal 601 and an output coupled to the SLM array 500. Electronics subsystem 600 processes incoming video signal 601 so as to provide PWM signals to drive elements 502 of array 500. The PWM signals control the angle and dwell time of elements 502 of array 500 in accordance with pixel values provided by video signal 601. Properties, for example, brightness, of pixels displayed on display screen 499 are related to the dwell time of respective corresponding micro-mirror elements 502.

Electronics subsystem 600 receives a video signal 601 from a source of video signals (not shown). Video signal 601 comprises video image data corresponding to video images to be projected and displayed on display device 499. Electronics subsystem 600 processes video signal 601 and provides a processed video signal 602 to drive array 500.

Optics system 400 comprises at least one relay and illumination optics portion 300, at least one projection optics portion 200 and at least one light source 301. Light from light source 301 is transmitted through at least one relay optics portion 300. Light from relay optics portion 300 is projected onto light reflecting elements 502 of SLM array 500.

According to embodiments of the invention, video signal 601 is provided by at least one of a wide variety of suitable video signal sources. Suitable video signal sources include for various embodiments of the invention are too numerous to recite in total. However, some examples include, but are not limited to, digital versatile disk (DVD) systems, set top boxes, broadcast video sources, Internet video sources, cable video sources, satellite video sources, wireless and telephonic sources, to name but a few. Embodiments of the invention comprise digital video intermediate systems wherein video sources include film, telecines, video masters and the like.

Regardless of video signal source, suitable video signals 601 for embodiments of the invention include, among others, analog video signals, digital video signals, component video signals and composite video signals. Suitable signal formats include, among others, National Television Standards Committee (NTSC) format, Phase Alternate Lines (PAL) format, and PAL plus format. Any video format providing pixel values corresponding to pixels of an image to be displayed is suitable for use in various embodiments of the invention.

Figure 2:
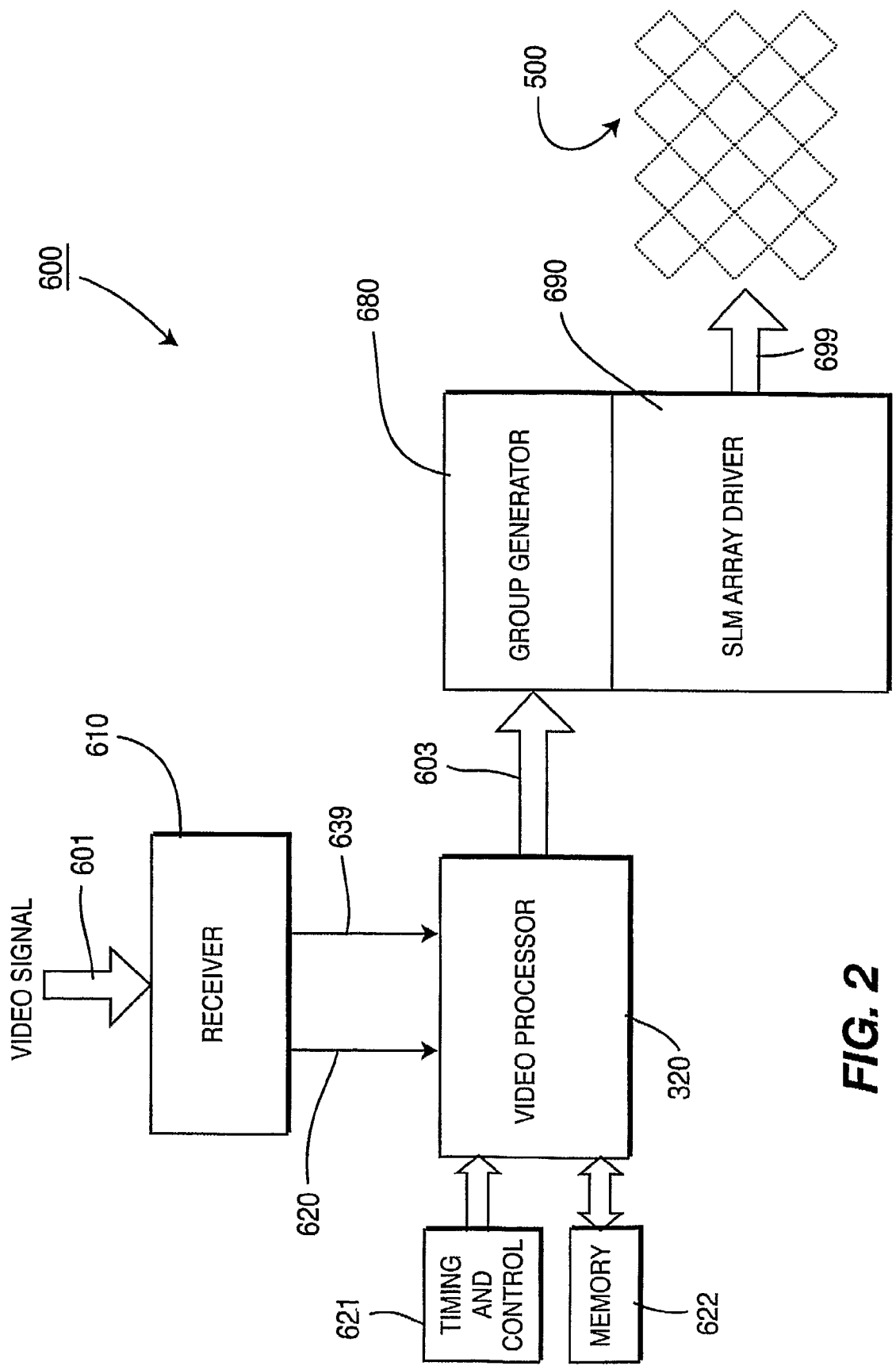
FIG. 2 is a block diagram illustrating in more detail the electronics subsystem of the display system illustrated in FIG. 1.

FIG. 2 illustrates functional blocks of the electronics subsystem 600 illustrated in FIG. 1 according to an embodiment of the invention. Electronics subsystem 600 comprises a receiver 610 for receiving video signal 601. Receiver 610 is coupled to video processing unit 640. Video processing unit 640 is coupled to SLM array driver 690.

According to embodiments of the invention, receiver 610 receives video signal 601 at an input. In an example embodiment of the invention, receiver 610 decodes video signal 601 and performs Analog to Digital (A/D) conversion, Luminance-chrominance separation (Y/C separation), and chrominance demodulation of video signal 601 in accordance with conventional video signal receiving and decoding techniques, According to embodiments of the invention, video processing unit 640 further provides video processing functions, for example, progressive scan conversion, and resampling of video signal 601 in accordance with conventional techniques. Video processing unit 640 is coupled to an SLM device driver 690. SLM device driver 690 provides drive signals for driving elements 503 of SLM array 500. According to an embodiment of the invention, video processor provides enhanced Chrominance (2C) and Luminance (2Y) signals for use by driver 690 in driving elements 503 of array 500 so as to modulate light in accordance with video signal 601.

Video processing unit 640 includes pixel filter 320 coupled to a pixel group generator 680. In one embodiment of the invention, pixel group generator 680 is a conventional device providing pixel groups for so called, "smooth pixel" processing techniques. According to one embodiment of the invention, pixel filter 320 is implemented by programming a processor of video processing unit 640 so as to implement pixel processing functions in accordance with the various embodiments of the invention described herein. In alternative embodiments of the invention, functions of pixel filter 320 are provided by hardware without the need for programming a processor. Still other embodiments of the invention implement some functions of pixel filter 320 in hardware while other functions are implemented by a processor programmed for carrying out the other functions. However, as those of ordinary skill in the art will readily appreciate upon reading the specification herein, a wide variety of hardware and software combinations will be suitable for implementing the invention. Therefore, the pixel filter of the invention is not limited to one specific hardware and processor arrangement.

According to one embodiment of the invention, receiver portion 610 provides luminance (Y) signals 620 to pixel filter 320 based upon video signal 601. According to one embodiment of the invention, receiver portion 610 provides chrominance (C) signals 649 to pixel filter 320 based upon video signal 601.

In some embodiments of the invention, video signal processor 640 provides further processing functions including, for example, color space conversion, gamma correction removal, error diffusion, on screen display capability, Red, Green, Blue (RGB) input receiving capability, and user operable image controls. In one embodiment of the invention, driver 690 includes a Field Programmable Gate Array (FPGA).

In one embodiment of the invention Field Programmable Gate Array (FPGA) 690 receives RGB video signals from video signal processor 640 and provides PWM control functions, image reformatting, bit plane conversion and DMD drive signal functions based, at least in part, on the RGB video signals. According to embodiments of the invention, system 600 further comprises memory 622 and timing and control circuits 621 for electronics subsystem 600.

As will be readily appreciated by those of ordinary skill in the art processors are commonly embedded throughout systems in a wide variety of configurations and capabilities. Any processor configuration implementing the inventive circuits, systems and methods described herein remain within the scope of the invention.

Figure 3:
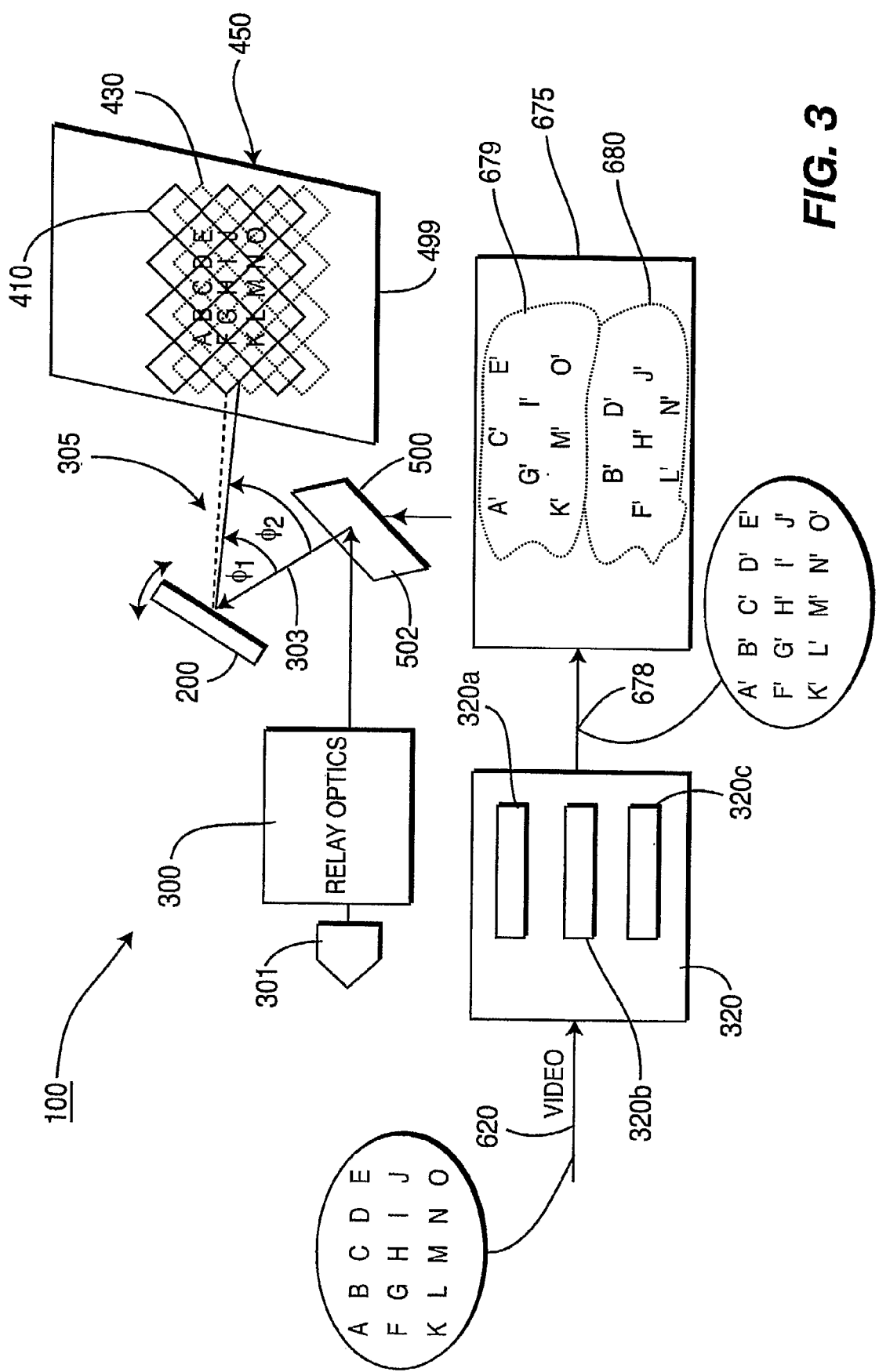
FIG. 3 is a block diagram illustrating an SLM system including a pixel filter according to an embodiment of the invention.

FIG. 3 is a block diagram illustrating an embodiment of the invention. Display screen 499 is arranged with respect to SLM array 500 so as to display an image comprising a matrix 450 of pixels. Matrix 450 comprises at least a first pixel group 410 and a second pixel group 430. (also illustrated in FIG. 4). According to alternative embodiments of the invention, matrix 450 comprises more than two pixel groups. According to an embodiment of the invention, the number of pixels comprising matrix 450 is greater than the number of elements 502 of SLM array 500 used to provide first and second pixel groups 410 and 430.

As illustrated in FIG. 3, light from a light source 301 is transmitted through relay optics subsystem 300. In one embodiment of the invention, optics subsystem 300 includes a means for providing colored light. According to one embodiment of the invention, optics subsystem 300 includes a color wheel alternately producing red, green and blue light.

According to an alternative embodiment of the invention, light source 301 comprises a red light source, a green light source and a blue light source. The colored light is projected onto array 500 and reflected from array 500. Light reflected from array 500 is provided to display 499 via projection optics subsystem 200.

Elements 502 of array 500 are driven in accordance with pixel values provided by pixel data set 620. Each pixel of matrix 450 corresponds to a pixel value of incoming pixel data set 620. Pixel data set 620 is generated based upon video signal 601. In FIG. 3 pixel data set 620 is represented by an arrangement of letters A through O.

Pixel processor 320 adjusts pixel values of pixel data set 620 and provides adjusted pixel data set 678 to pixel group generator 675. In FIG. 3 adjusted pixel data set 678 is represented by an arrangement of letters A' through O'. Pixel group generator 675 separates adjusted pixel data set 678 into first and second pixel data groups (679 and 680). In one embodiment of the invention, pixel group generator 675 operates in accordance with a known pixel processing technique such as a "smooth pixel" processing technique. According to smooth pixel processing, an input pixel data set, for example, 620 is separated into first and second pixel data groups. The first and second pixel data groups provide first and second pixel groups comprising a displayed matrix.

However, conventional pixel processing techniques do not include pixel filter 320, nor do conventional systems provide an adjusted pixel data set 678 to a pixel generator 675. Accordingly, first and second pixel groups 410 and 430 comprising matrix 450 according to the invention provide significant advantages over conventional smooth pixel processing techniques.

Figure 4:
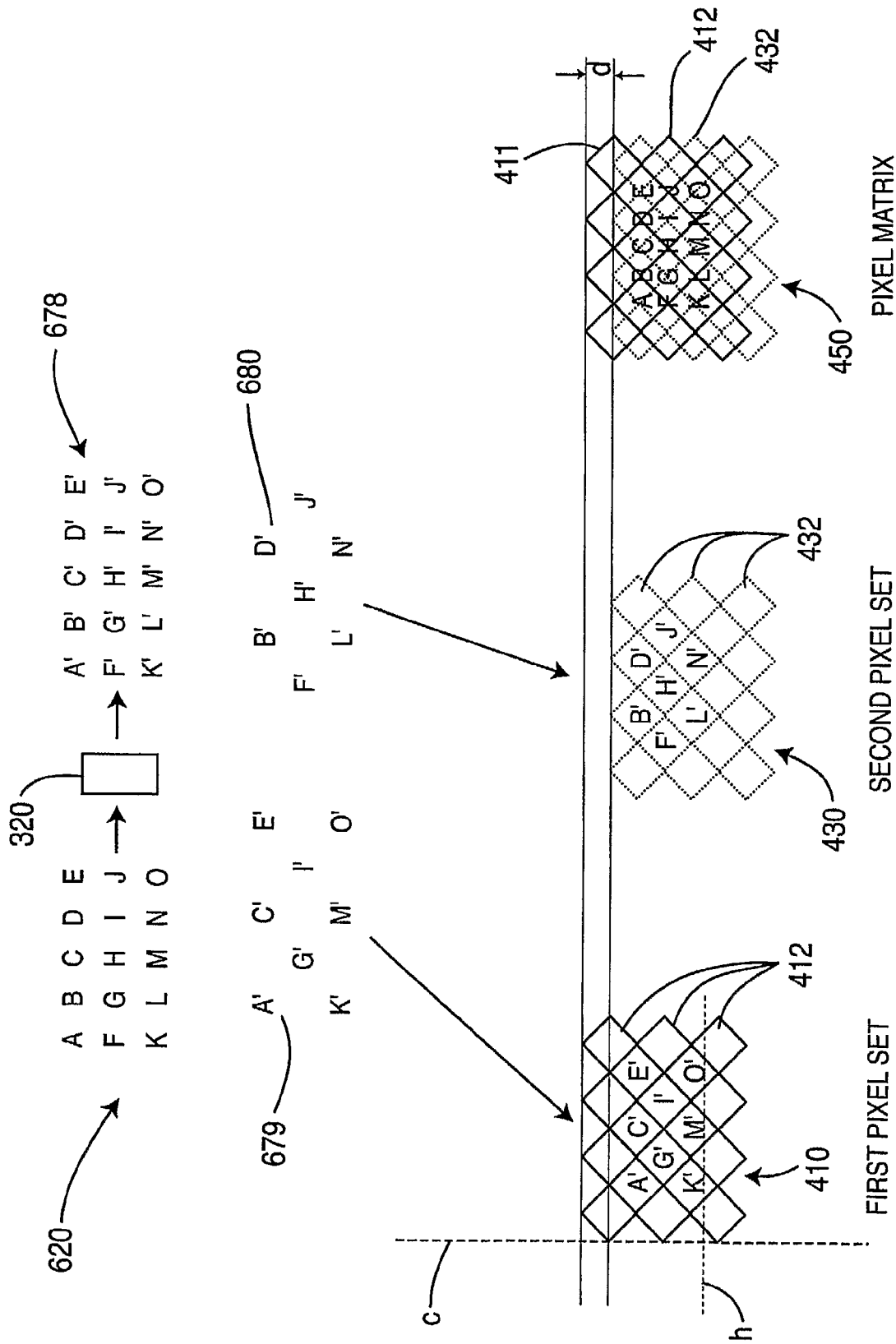
FIG. 4 is a diagram illustrating relationship between received pixel data, adjusted pixel data and a pixel matrix according to an embodiment of the invention.

FIG. 4 illustrates the relationship between pixel data set 620, adjusted pixel data set 678, pixel data groups 679 and 680, pixel groups 410 and 430, and pixel matrix 450 according to an embodiment of the invention. As illustrated in FIG. 4, first pixel group 410 comprises rows h and columns c of adjacent pixels 412. For convenience, a single indicator 412 indicates individual pixels of group 410. Second pixel group 430 comprises rows h and columns c of adjacent individual pixels 432.

Pixel groups 410 and 430 are projected onto display screen 499 so as to appear displaced from each other, for example, by a distance d. In one embodiment of the invention, pixel groups 410 and 430 are displaced from each other in a direction substantially in x-direction of the plane of the surface of display screen 499.

In one example embodiment of the invention, second pixel group 430 is displayed spaced from first pixel group 410 by a distance equal to about half of the height of a single pixel. The resulting pixel matrix 450 therefore comprises overlapping pixels. In other words, individual pixels from first pixel group 410, overlap individual pixels from second pixel group 430.

In one embodiment of the invention, SLM elements 502 comprise diamond shaped elements. Therefore, pixels of matrix 450 comprise substantially diamond shaped pixels (example illustrated in FIG. 4). However, other pixel shapes, e.g. square pixels, are known, and are suitable for some applications of the invention.

FIG. 3 illustrates an optical element 210 as one example of conventional means for providing the spacing for pixel groups 410 and 430. Optical element 210 reflects one of pixel sets 410 and 430 onto screen 499 at a first angle $\emptyset_1$. Optical element 210 subsequently projects the other pixel set at a second angle $\emptyset_2$. This technique has the advantage of providing a matrix 450 with more displayed pixels than the number of available elements 502 on SLM device 500. In one embodiment of the invention, the number of pixels comprising matrix 450 is about twice the number of available micro-mirrors 502 of SLM device 500.

However, the technique described above results in overlapping pixels. Light from each of the overlapping pixels combines. Therefore, the displayed brightness for a given pixel sometimes fails to correspond to the brightness value provided in pixel data set 620. In some cases the displayed brightness of overlapping pixels is greater than the intended brightness. In other cases, the displayed brightness of overlapping pixels is less than the intended brightness.

According to an embodiment of the invention pixel data set 620 is provided to pixel filter 320. Filter 320 provides modified pixel data set 678. Pixel data groups 679 and 680 are formed from modified pixel data set 678. The pixel values of pixels of pixel data groups 679 and 680 are used to generate pixel groups 410 and 430 respectively. Displayed combined pixel groups 410 and 430 comprise matrix 450.

In accordance with an embodiment of the invention, pixel filter 320 provides adjusted example data set 678 as represented by the following diagram:

$$A' \quad B' \quad C' \quad D' \quad E'$$
$$F' \quad G' \quad H' \quad I' \quad J'$$
$$K' \quad L' \quad M' \quad N' \quad O'$$

First pixel data group 679 comprises pixel data labeled A', C', E', G', I', K', M', O. Second pixel data group 680 comprises pixels labeled B', D', F', H', J', 'L, N'. Pixel groups 410 and 430 are generated based on pixel data groups 679 and 680 respectively. Matrix 410 comprises first pixel group 410 and second pixel group 430.

As can be seen from the drawing of matrix 450, pixels from the first pixel group 410 at least partially overlap pixels of pixel group 430 and vice versa. For example, the G pixel position in the first pixel group 410 is overlapped by the B, F. L and H pixel positions from the second pixel group 430. This overlap causes intensity distortion of the image represented by matrix 410.

Figure 5:
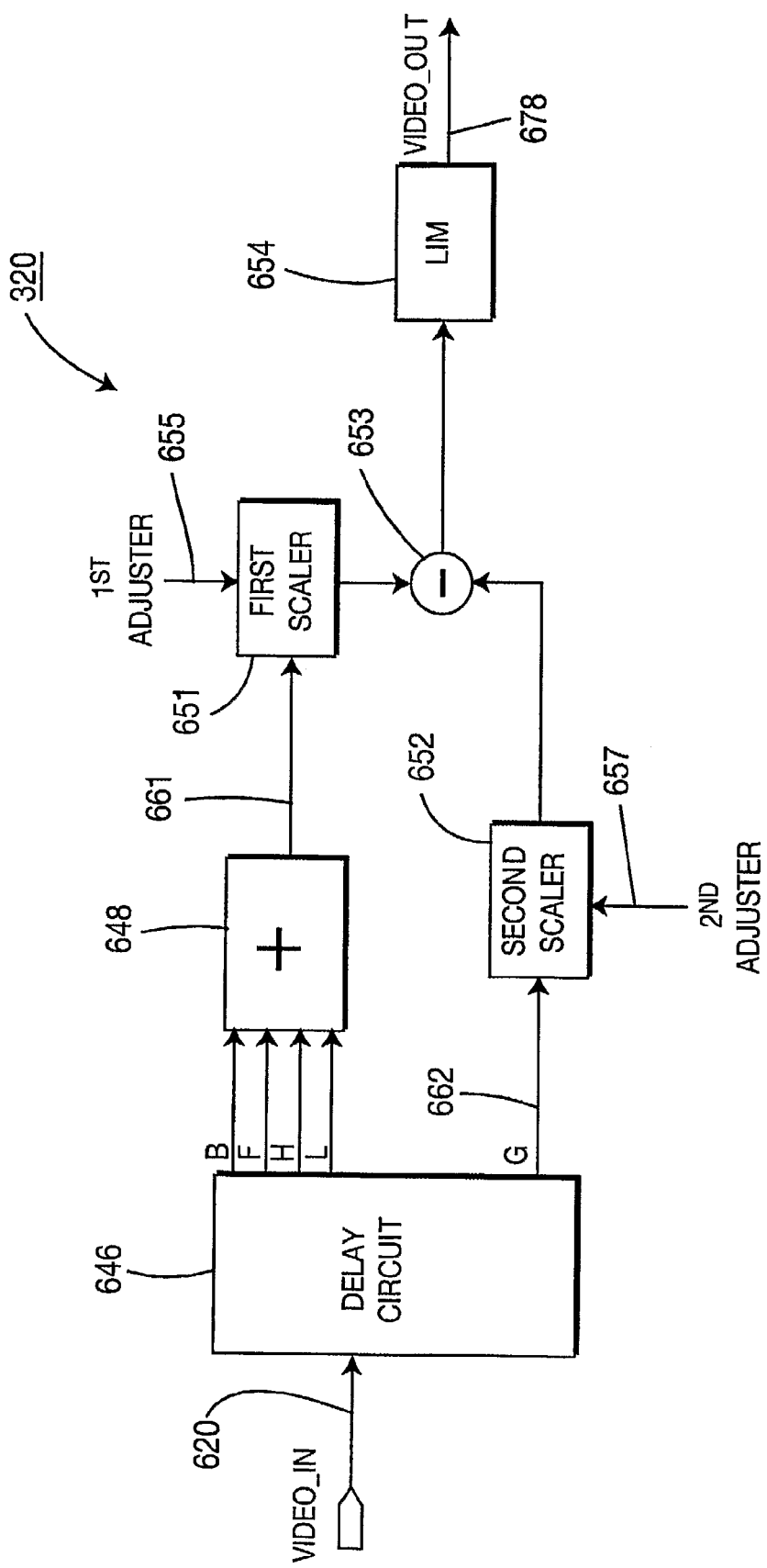
FIG. 5 is a block diagram of a pixel filter according to an embodiment of the invention.
Figure 7:
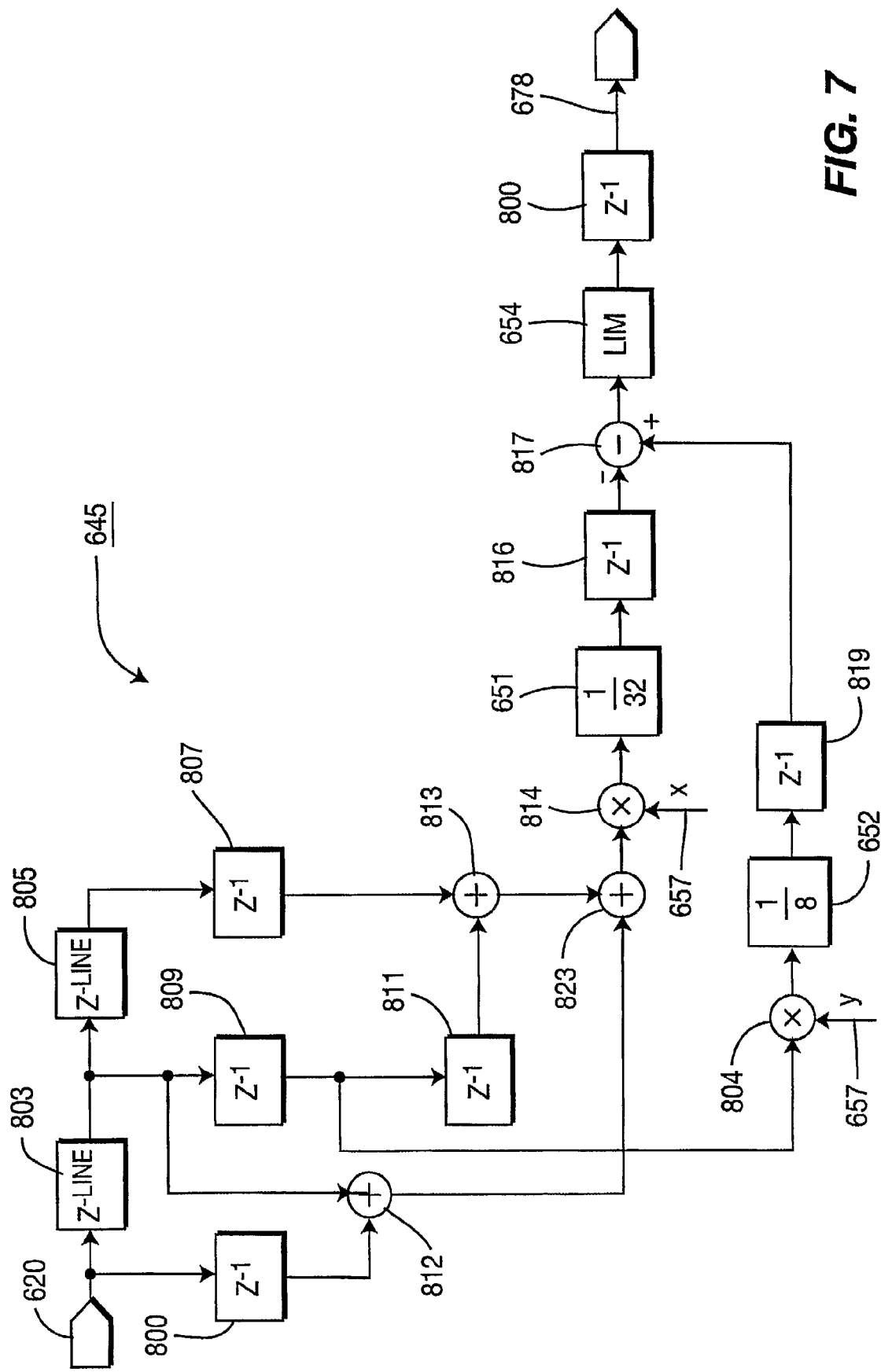
FIG. 7 is a detailed diagram of an embodiment of the pixel data processing device illustrated in FIG. 5.

According to an embodiment of the invention, distortion in pixel intensity caused by the overlap is reduced by an image enhancing filter arrangements 320 illustrated in FIGS. 3, 5 and 7.

FIG. 5 illustrates an embodiment of a pixel filter 320 according to an embodiment of the invention. Pixel filter 320 comprises at least one two-dimensional filter that operates on respective pixels of pixel data set 620 in accordance with an array h given by:

$$\begin{matrix} & -\alpha & \\ -\alpha & \beta & -\alpha \\ & -\alpha & \end{matrix}$$

wherein β is a scaling factor associated with a pixel of pixel data set 620 from which the intensity distortion is to be removed; and α is a scaling factor for pixels overlapping the pixel of pixel data set 620 from which the intensity distortion is to be removed.

More particularly, filter 320 adjusts intensity values I of respective pixels of data set 620 by an amount sufficient to compensate for the intensity contribution of pixels overlapping a respective pixel in matrix 450. For example, in FIG. 4, the intensity ($I_G$) of pixel G in pixel data set 620 is scaled by an amount ($\beta$) such that the intensity distortion caused by overlapping pixels B ($I_B$), F ($I_F$), L ($I_L$) and H ($I_H$) in displayed matrix 450 is reduced. In an embodiment of the present invention, adjusted pixel G' has an adjusted intensity value $I_{G'}$ in accordance with the relationship illustrated below:

$$I_{G'}=\beta(I_G)-\alpha(I_H+I_L+I_B+I_F) \quad (1)$$

Wherein:

$\beta$ is a scaling factor associated with the pixel G from which the intensity distortion is to be removed; and $\alpha$ is a scaling factor associated with overlapping pixels that are contributing to the intensity of pixel G.

According to one embodiment of the invention, a relationship between $\beta$ and $\alpha$ is given by: $\beta=1+4\alpha$. This relationship provides unity DC gain. However, the invention is not limited in this regard. In one embodiment of the invention, $\alpha$ is approximately +⅛ and $\beta$ is approximately 3/2. Selecting these example scaling factors has been found to provide unity DC gain while compensating for distortion in some embodiments of the invention.

According to the example above, the pixel data for the example data set 620, and the adjusted data set 678 is represented as follows:

```
A  B  C  D  E        A'  B'  C'  D'  E'
F  G  H  I  J   →    F'  G'  H'  I'  J'
K  L  M  N  O        K'  L'  M'  N'  O'
```

FIG. 5 is a block diagram illustrating an example filter arrangement 320 representing one of three like filters 320a, 320b, 320c illustrated in FIG. 3. Filter 320 implements the relationship described in equation 1 above for each pixel in respective red, green and blue components of component video signal 620. For convenience, the operation of one filter 320 will be described in relation to an example pixel G. Overlapping pixel groups 410 and 430 as shown in FIG. 4 are referred to herein as an example for purposes of discussion. However, it will be understood that each of the pixels comprising incoming pixel set 620 are suitable for processing in the same way to remove intensity distortion caused by overlapping pixels.

Referring to FIG. 5, a pixel filter 320 according to an embodiment of the invention is illustrated. Pixel filter 320 comprises a delay circuit 646. Delay circuit 646 receives pixel data of pixel data set 620. Delay circuit 646 delays the received pixel data so as to provide pixel data for a plurality of pixels substantially simultaneously. In the example illustrated in FIG. 5, delay circuit 646 provides pixel data for pixels H, L, F and B (overlapping example pixel G in matrix 450.) to adder 648. At the same time, delay circuit 646 provides data for example pixel G to a second scaler 652. Adder 648 provides an output representative of the sum of pixel values for pixels H, L, F and B to a first scaler 651. First scaler 651 applies a scaling factor $\alpha$ to its input to provide a scaled output. Second scaler 652 applies a scaling factor $\beta$ to its input to provide a scaled output. The scaled outputs of scalers 651 and 652 are combined by subtractor 653. The difference output of subtractor 653 represents an adjusted value G' for example pixel G. According to one embodiment of the invention, the difference output of subtractor 653 is optionally provided to a limiter. In that case, successive output values provided by limiter 654 comprise adjusted pixel data set 678.

According to one embodiment of the invention, a scaling factor for first scaler 655 is adjustable by an adjustment factor X provided by first adjuster, 655. According to one embodiment of the invention, a scaling factor for the second scaler 652 is adjustable by an adjustment factor Y provided by second adjuster 657.

Figure 6:
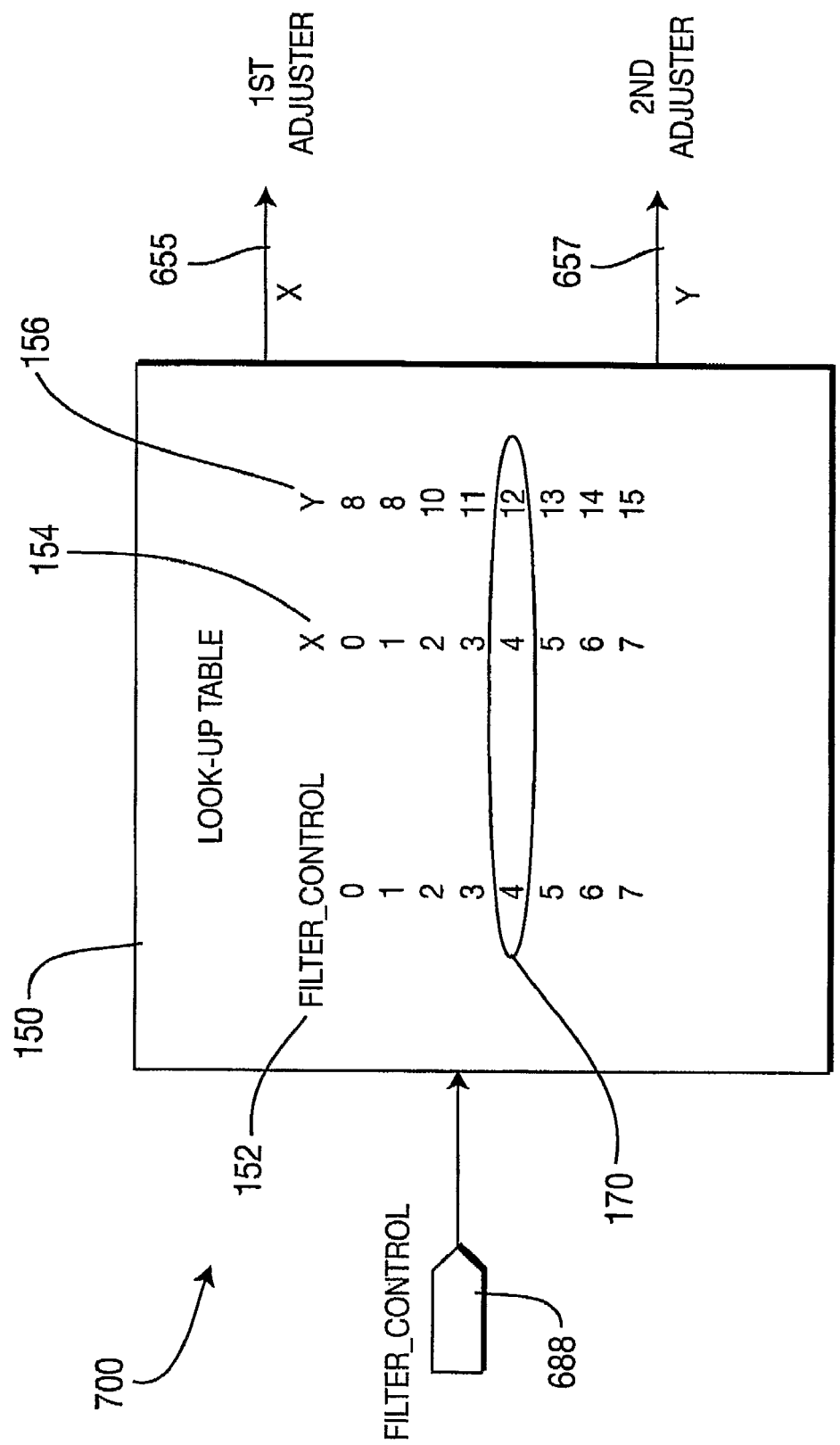
FIG. 6 illustrates an example lookup table suitable for use in the pixel data filter of FIG. 5 according to an embodiment of the invention.

FIG. 6 illustrates a pixel filter control circuit 700 for implementing an embodiment of pixel filter 320 including adjustable scaling factors. Filter control circuit 700 comprises a look up table 150. Look up table 150 stores a plurality of selectable XY pairs of adjustment factors for X 154 and Y 156. Each XY pair of the table corresponds to one of the filter control setting 152 of table 150. In the example illustrated in FIG. 6, eight possible filter control settings, e.g., 0 through 8 are provided. To select scaler adjustment factors X and Y a filter control signal representing one of the eight control settings is provided at filter control input 688 of table 150, The XY value pair corresponding to the filter control setting selected by input 688 provides adjustment factors X and Y to first and second adjusters 655 and 657. In that manner, lookup table 150 provides adjustable scaling factors for scalers 655 and 652.

In one embodiment of the invention, the X and Y values of table 150 maintain a given relationship between scaling factors $\alpha$ and $\beta$ while permitting adjustment of scaling factors $\alpha$ and $\beta$. In one embodiment of the invention, the given relationship between $\alpha$ and $\beta$ is a unity gain relationship given by:

$$\beta=1+\alpha.$$

FIG. 7 is a more detailed diagram of one embodiment of the filter illustrated in FIG. 6. A video signal representing pixel data set 620 is provided to full line delay registers 803 and 805. Line delay registers 803 and 805 delay the video signal by an entire line of displayed video according to one embodiment of the invention. For the purpose of the present example, the delays of line delay registers 803 and 805 are chosen according to the principles illustrated by the following example. When the data for pixel M, for example, is presented at input 620, the output of line delay register 805 will be H and the output of line delay register 803 will be C. As illustrated in FIG. 7, the output of line delay registers 805, 803 and the original video input signal, e.g., M are coupled respectively to a second bank of delay registers 807, 809, and 800. The outputs of delay registers 803 and 800 are added by adder 812. The output of adder 812 is provided to a first input of adder 823.

A second input to adder 823 is provided as follows. An output of delay element 809 is provided to delay element 811. The output of delay element 811 is provided to one input of adder 813. The other input to adder 813 is provided by the output of delay element 807. A sum output of adder 813 is coupled to the second input to adder 823.

According to the example above, the sum H+L+B+F is provided. Pixels H, L, B and F are pixels overlapping pixel G in matrix 450 of FIG. 1. This sum represents a sum of pixel intensity values for each of the pixels that overlap pixel G. The sum H+L+B+F is then scaled by a scaling factor $\alpha$. Scaling is accomplished in one embodiment of the invention as follows. The sum H+L+B+F is provided to multiplier 814. Multiplier 814 multiplies the sum H+L+B+F accordance with a first multiplier X, indicated at multiplier input 655. The output of multiplier 655 is provided to divider 651. In the embodiment illustrated In FIG. 7 divider 651 divides the output or multiplier 655 by 32. Therefore, the sum (H+L+B+H) output from adder 823 is scaled by a factor of x/32, where 32 is a constant and x/32 comprises scaling factor α. For example if x=4 in FIG. 7, then a=4/32 or 1/8. Accordingly, the scaled sum for pixels in the example above is (1/8) (H+L+B+F).

Similarly, a second scaling factor β is applied to pixel data value G by providing data value G to multiplier 804. The output of multiplier 804 is provided to a 1/8 divider 652. Therefore, G is scaled by a factor of y/8 comprising scaling factor β. A subtractor 817 provides an output representing the difference between the scaled pixel intensity data value β(G) and the scaled sum of the intensity values of overlapping pixels, i.e., (α) (H+L+B+F).

In one embodiment of the invention the output of subtractor 817 is provided to a limiter 654. Limiter 654 maintains the difference value provided by subtractor 817 within a range of pixel intensity values. According to one embodiment of the invention, various additional delay registers, e.g., 819 are provided in the filter circuit in FIG. 7 to allow for circuit settling times.

It will be appreciated by those of ordinary skill in the art that various other relationships between β and α, e.g., other than unity gain relationships, are possible. Table 600 is suitable for implementing a wide variety of relationships. The other relationships can readily be accomplished by substituting appropriate values of x y pairs in table 600. Advantageously the pairs are customizable such that a specific relationship is maintained between β and α for all values of x and y pairs on the table.

According to one embodiment of the invention, look up table 150 is implemented in a memory (not shown), for example, a semiconductor memory. In that case, the memory stores values of x and y. The memory includes x and y outputs coupled to inputs x (indicated at 655) and y (indicated at 657) respectively of filter 645 of FIG. 7. In a look up table embodiment comprising eight x,y pairs, x is selectable such that α ranges in 1/32 increments between 0 to 7/32. For the same table, y is selectable such that β ranges from 1 to 15/8 in increments of 1/8.

Those skilled in the art will readily appreciate that the foregoing filters are capable of implementation in various combinations of software, hardware and/or firmware. According to one embodiment of the invention, look up table values are stored in an electronic memory. For example, data sets can be stored in a bus register, RAM or other data storage device associated with a DLP system microprocessor. Still, the invention is not limited in regard to memory types, and other suitable methods exist for storing such values. In one embodiment of the invention, filter control values are selectable by a user via a user operable interface with a DLP display system. According to another embodiment of the invention, filter control values are automatically adjusted by a system microprocessor (not shown) provided for controlling the DLP system.

Further, while FIGS. 5 and 7 represent embodiments of filters according to the invention, those skilled in the art will recognize that the invention is not limited to particular component arrangements. For example, other filter architectures are possible for implementing the invention. That is, other filter architectures are suitable for operating on pixel values so as to adjust pixel intensity to at least partially compensate for the intensity distortion caused by overlapping pixels. Further, while it is be advantageous in many embodiments of the invention to select β=1+4α, the invention is not limited in this regard to such values. The values of β and α are selectable to have other values and relationships according to various embodiments of the invention.

The invention claimed is:

1. A method for reducing distortion in images provided by a display system employing an array of individual pixel elements in a Spatial Light Modulator comprising the steps of:
   providing a set of pixel values corresponding to pixels of an image to be displayed wherein the number of pixel values comprising said set is greater than the number of available SLM elements;
   adjusting at least some of said pixel values to provide a set of adjusted pixel values;
   generating at least a first set of pixels and a second set of pixels from said set of adjusted pixel values;
   transmitting light from a relay optics portion onto micromirror elements containing adjusted first and second pixel group sets;
   reflecting said transmitted light containing said adjusted first and second pixel sets off an optical element at varying angles to provide spacing between said pixel group set when projected onto a display screen;
   displaying said image on said display screen as a matrix of pixels comprising said first set of pixels and said second set of pixels, wherein the number of pixels of said matrix is greater than the number of said SLM elements, and wherein at least one of the pixels of said first set overlaps at least one of the pixels of said second set;
   wherein said adjusting step is carried out by adjusting pixel values of said set of pixel values to compensate for image distortion due to overlapping pixels of said matrix; wherein said adjusting step includes a step of scaling a first respective pixel value of said set of pixel values in accordance with a first scaling factor β, summing values of pixels overlapping said first respective pixel values and scaling the sum by a second scaling factor, α, and subsequent to said scaling step, subtracting said first respective pixel value from said summed pixel values to determine an adjusted value of said first respective pixel value.

2. The method of claim 1 wherein said set of pixel values comprises luminance values.

3. The method of claim 1 wherein said set of pixel values comprises chrominance values.

4. The method of claim 1 wherein said first scaling factor is adjustable.

5. The method of claim 1 wherein said second scaling factor is adjustable.

6. The method of claim 1 wherein said first scaling and second scaling factors are related according to the equation: β=1+4α.

7. A system employing an array of individual pixel elements in a Spatial Light Modulator to display video images comprising:
   a source of video image data comprising at least one set of pixel values corresponding to pixels of an image to be displayed wherein the number of pixel values in said at least one set is greater than the number of individual pixel elements in said SLM, said at least one set of pixel values further comprising a respective pixel value and a plurality of pixel values corresponding to pixels that overlap a respective pixel having said respective pixel value;
   a pixel processor further comprising a filter, said filter coupled to said source to receive said at least one set of pixel values, said filter configured to adjust at least one pixel value in said set to provide an adjusted set of pixel values said filter includes at least one of a first scaling factor for scaling said respective pixel value and a second scaling factor for scaling said plurality of pixel values that overlap said respective pixel value;

a pixel group generator coupled to said filter to receive said adjusted set of pixel values, said pixel group generator providing at least a first group of pixels and a second group of pixels based upon said adjusted set of pixel values;

a relay optics portion configured for transmitting light onto micromirror elements containing an adjusted first pixel data group and an adjusted second pixel data group;

an optical element configured for reflecting at varying angles said transmitted light containing said adjusted first pixel data group and said adjusted second pixel data group to provide spacing between said adjusted first and second pixel groups when said adjusted pixel groups are projected onto a display screen;

wherein said individual pixel elements in said SLM cooperate with said pixel group generator to display said image as a matrix of pixels comprising said first group of pixels and said second group of pixels, wherein at least one of the pixels of said first group overlaps at least one of the pixels of said second group in said matrix;

wherein said filter is configured to adjust pixel values of overlapping pixels to compensate for image distortion due to said overlapping pixels.

8. The system according to claim 7 wherein at least one of said first and second scaling factors is adjustable.

9. The system according to claim 7, wherein said pixels comprise diamond shape pixels.

10. The system according to claim 7, wherein said filter is further comprised of an adder configured for summing said plurality of pixel values corresponding to pixels that overlap said respective pixel value.

11. The system according to claim 10, wherein said filter is further comprised of a subtractor for subtracting said first respective scaled pixel value from said summed scaled pixel values to determine an adjusted value of said first respective pixel value.

* * * * *

UNITED STATES PATENT AND TRADEMARK OFFICE
CERTIFICATE OF CORRECTION

| | | |
|---|---|---|
| PATENT NO. | : 7,605,832 B2 | Page 1 of 1 |
| APPLICATION NO. | : 10/593509 | |
| DATED | : October 20, 2009 | |
| INVENTOR(S) | : Mark Francis Rumreich | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 204 days.

Signed and Sealed this

Fifth Day of October, 2010

David J. Kappos
*Director of the United States Patent and Trademark Office*